United States Patent [19]
Fukuhara et al.

[11] 4,263,578
[45] Apr. 21, 1981

[54] BELT DRIVE CONNECTION MALFUNCTION SENSOR

[75] Inventors: Takao Fukuhara, Yamato; Kunihiro Saito, Tokyo, both of Japan

[73] Assignee: Nissan Motor Company, Limited, Japan

[21] Appl. No.: 45,091

[22] Filed: Jun. 4, 1979

[30] Foreign Application Priority Data

Jun. 8, 1978 [JP] Japan ............................. 53-68312
Jun. 8, 1978 [JP] Japan ............................. 53-68324

[51] Int. Cl.³ .......................................... G08B 21/00
[52] U.S. Cl. .................................. 340/52 R; 307/123; 324/166; 324/169; 340/679; 340/681
[58] Field of Search ................... 340/52 R, 681, 679, 340/671; 307/123; 324/161, 169, 166

[56] References Cited
U.S. PATENT DOCUMENTS 3,075,127  1/1963  Secunde et al. ................... 324/166
3,836,853  9/1974  Cracraft et al. .................... 324/166
3,877,003  4/1975  Kamashima et al. ............. 340/52 R Primary Examiner—Glen R. Swann, III
Attorney, Agent, or Firm—Lane, Aitken, Ziems, Kice & Kananen

[57] ABSTRACT

An A.C. voltage picked up from the alternator driven by an internal combustion engine is converted into a pulse train signal so that the number of the pulses is counted for a period of time defined by a reference timing signal produced in synchronization with the rotation of the crankshaft of the engine. When the number of the pulses reaches a predetermined value during the period of time, a counter produces an output signal to indicate that the slipping rate of the belt is within a tolerance. On the other hand, when the number of pulses is less than the predetermined number, the counter does not produce an output signal (indicating that the slipping rate is over the tolerance). The output of the counter may be averaged over a plurality of measuring times.

10 Claims, 4 Drawing Figures

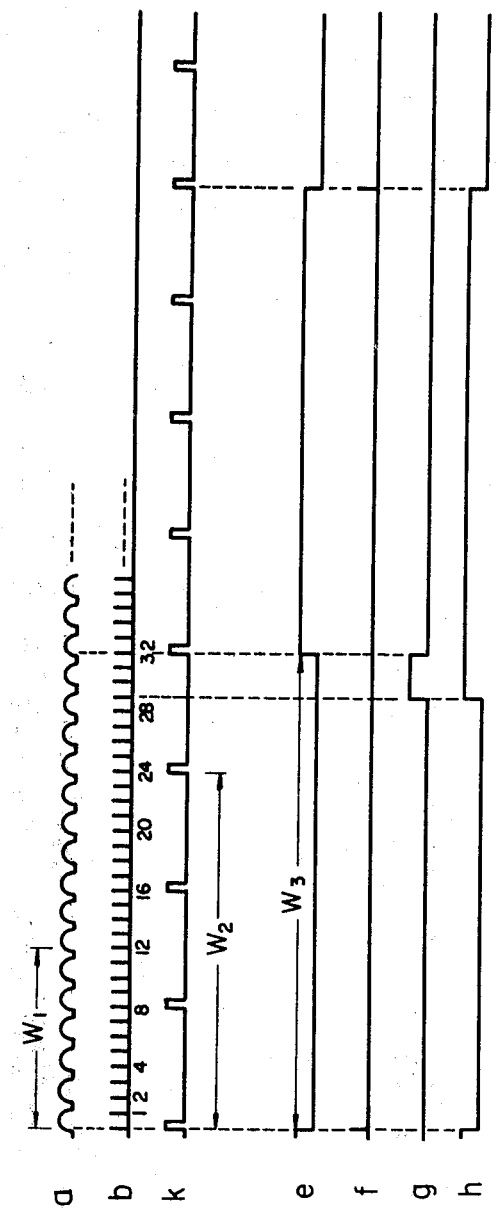

BELT DRIVE CONNECTION MALFUNCTION SENSOR

FIELD OF THE INVENTION

This invention generally relates to an apparatus for detecting a malfunction of a belt drive connection between an internal combustion engine and an auxiliary power consuming unit. More particularly, the present invention relates to such an apparatus which issues an alarm signal when the slipping rate of the belt exceeds a predetermined value.

BACKGROUND OF THE INVENTION

The crankshaft of an internal combustion engine mounted on a motor vehicle as a prime mover thereof, is arranged to drive several auxiliary power consuming units, such as a dynamo (alternator) and a cooling fan by means of a belt which is usually called a fan belt. Although the tension of the fan belt is so adjusted that all of the auxiliary power consuming units are properly driven by the engine, the tension along the fan belt is apt to be reduced. With insufficient tension the fan belt usually slips so that the engine power is not properly transmitted to the auxiliary power consuming units. As the result, tendency to undesirable phenomena, such as overheating the engine and overdischarge of the battery, increases.

There are some conventional detection devices which detect the slipping operation or rate of the fan belt. For instance, according to two Japanese Patent applications (provisional publication numbers: 47-41680, and 50-75468), the A.C. voltage generated by the alternator driven by the engine is detected and the frequency of the A.C. voltage is converted into an analogue signal the voltage of which is proportional to the frequency. Meanwhile, a pulse signal synchronous with the crankshaft rotation is detected and the frequency of the pulse signal is converted into a second analogue signal the voltage of which is proportional to the frequency. The voltages of the first and second analogue signals are compared by means of a comparator or a differential amplifier to see the difference therebetween. Since the difference between the first and second signals indicates the slipping rate of the fan belt, the output signal of the comparator or the differential amplifier may be used for issuing an alarm signal.

However, the above mentioned prior art technique, suffers from the following disadvantages. Since the first information derived from the alternator and the second information derived from the engine crankshaft rotation are respectively converted into analogue signals, the voltages of these analogue signals vary in wide ranges as the engine crankshaft rotational speed varies. When the input voltages of the comparator or the differential amplifier vary in a wide range, the output signal of the comparator or the differential amplifier is apt to include errors. In other words, accurate detection of the difference between the first and second pieces of information can not be obtained when the engine r.p.m. changes drastically. Furthermore, since the variation range of the first and second analogue signals are so wide, the dynamic range of the comparator or the differential amplifier has to be large enough. This causes the detection device to be expensive. It will be understood that the engine speed for a motor vehicle especially varies in a considerably wide range, and therefore, the above mentioned disadvantages are inevitable.

SUMMARY OF THE INVENTION

This invention has been developed in order to remove the above mentioned disadvantages and drawbacks inherent to the conventional belt slipping detection sensors.

It is, therefore, an object of the present invention to provide a belt drive connection malfunction sensor in which the slipping operation of a fan belt is accurately detected throughout a wide range of the rotational speed of the crankshaft of the engine.

Another object of the present invention is to provide such a sensor of low cost.

A further object of the present invention is to provide such a sensor in which the accuracy of the detection is not influenced by the ambient temperature variation and the variation of the voltage of the power supply.

In order to achieve the above mentioned objects, an A.C. voltage generated by an alternator driven by the engine is picked up to produce a pulse train signal, while a reference timing sinal synchronous with the rotation of the crankshaft of the engine is produced, and then the number of the pulses is counted during a period of time corresponding to a predetermined angle of the rotation of the crankshaft to see whether or not the number of pulses is over a predetermined value.

BRIEF DESCRIPTION OF THE DRAWINGS

These and other objects and features of the present invention will become more readily apparent from the following detailed description of the preferred embodiments taken in conjunction with the accompanying drawings in which:

FIG. 4 shows a time chart of signals in the second embodiment shown in FIG. 3.

DETAILED DESCRIPTION OF THE PREFERRED EMBODIMENTS

Figure 1:
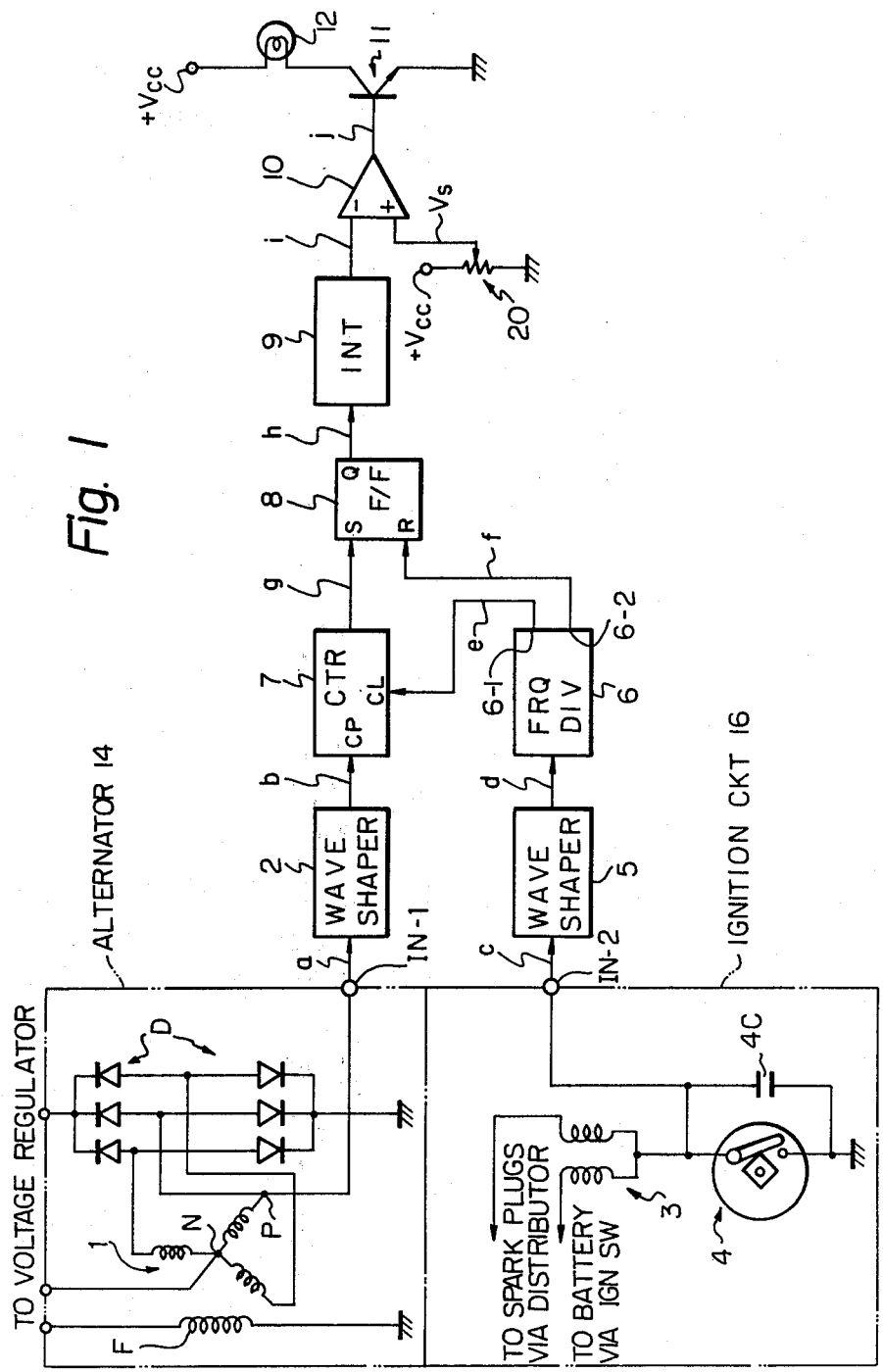
FIG. 1 shows a schematic block diagram of a first preferred embodiment of the belt drive connection malfunction sensor according to the present invention.

Referring to FIG. 1, a schematic block diagram of a first preferred embodiment of the belt drive connection malfunction sensor according to the present invention is shown. The circuit arrangement of the sensor has first and second input terminals IN-1 and IN-2 which are respectively connected to the alternator 14 driven by an engine, and the ignition circuit 16 of the engine.

The alternator 14 and the ignition circuit 16 are respectively enclosed by chain lines to indicate that these circuits are not included in the sensor according to the present invention. The alternator 14 is of a conventional three-phase type and has armature coils 1 and field coil F. Three armature coils 1 are connected to each other at a neutral point N, while respective end terminals of the armature coils 1 are connected to a rectifying circuit constituted by six diodes D. The alternator 14 has three terminals respectively connected to the field coil F, the neutral point N and the rectifying circuit and these three terminals are connected to a suitable voltage regulator (not shown). One end terminal P of an armature coil 1 is connected to the first input terminal IN-1 of the sensor to pick up and feed the A.C. voltage generated by the alternator 14.

The ignition circuit 16 has an ignition coil 3, a breaker mechanism 4 and a capacitor 4C. The ignition coil 3 includes primary and secondary windings respectively connected to the battery via an ignition switch and the spark plugs via a distributor. The breaker mechanism 4 includes a movable contact and a stationary contact and the movable contact is arranged to come into contact with the stationary contact by the cam shaft which rotates in synchronization with the crankshaft of the engine. The movable contact of the breaker mechanism 4 is connected to the primary and secondary windings, while the stationary contact is connected to ground. The capacitor 4C is connected across the movable and stationary contacts of the breaker mechanism 4. The movable contact is further connected to the second input terminal IN-2 of the sensor to feed the ignition pulses picked up.

The first input IN-1 of the sensor is connected to an input of a first waveform shaping circuit 2 the output of which is connected to a clock pulse input CP of a pre-settable counter 7. The second input terminal IN-2 of the sensor is connected to an input of a second waveform shaping circuit 5 the output of which is connected to an input of a frequency divider 6. The frequency divider 6 has first and second output terminals 6-1 and 6-2 respectively connected to a clear terminal CL of the counter 7 and a reset terminal R of a flip-flop 8. The output of the counter 7 is connected to a set terminal S of the flip-flop 8 the output Q of which is connected to an input of an integrator 9. The output of the integrator 9 is connected to an inverting input (−) of a comparator 10 (operational amplifier) which has a noninverting input (+) connected to a variable resistor 20. The variable resistor 20 is interposed between a positive power supply +Vcc and ground to develop a predetermined reference voltage Vs with which an integrator output will be compared. The output of the comparator 10 is connected to a base of a transistor 11, which functions as a switch, the emitter of which is grounded. The collector of the transistor 11 is connected via a lamp 12 to the positive power supply +Vcc.

The operation of the sensor shown in FIG. 1 will be described hereinafter in connection with time chart of FIG. 2.

Figure 2:
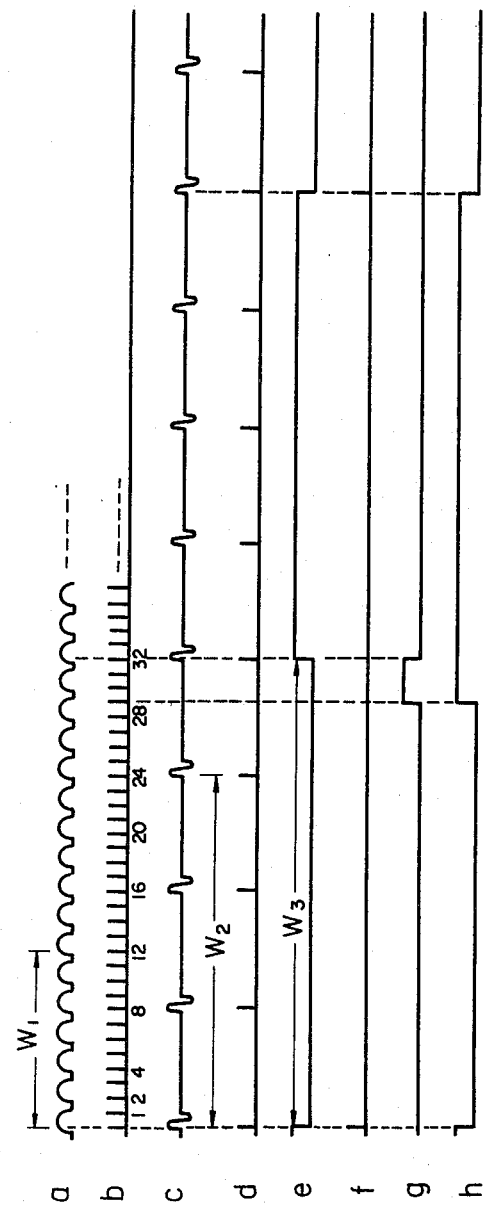
FIG. 2 shows a time chart of signals in the first embodiment shown in FIG. 1.

The shaft (not shown) of the alternator 1 is driven via a belt by the engine crankshaft (not shown) and therefore, the alternator 1 produces pulsating D.C. voltage "a." The pulsating D.C. voltage "a" is picked up from the point P of the alternator 1 and this voltage "a" has six positive going half cycles per one revolution of the shaft of the alternator 1 as shown in FIG. 2. Although it is possible to pick up the voltage from the neutral point N, it is advantageous to pick up the voltage from one of the opposite end terminals of the three armature coils 1 for the waveform of the voltage at each of the end terminals of the armature coils 1 is more distinct than the waveform of the voltage at the neutral point N. A reference $W_1$ in FIG. 2 indicates a period of time corresponding to one revolution of the shaft of the alternator 1. The first waveform shaping circuit 2 produces a pulse train signal "b" in response to the leading and trailing edges of the positive going half cycle of the voltage "a". The pulse signal "b" produced by the first waveform shaping circuit 2 is applied to the counter 7 in which the number of the pulses "b" is counted as will be described hereinafter.

The ignition pulse signal "c" derived from one terminal of the breaker mechanism 4 is applied via the second input terminal IN-2 to the second waveform shaping circuit 5. It is assumed that the engine is of six-cylinder and four-cycle type and therefore, the number of the ignition pulses per a single rotation of the crankshaft of the engine is three as shown in FIG. 2. A reference $W_2$ indicates a period of time corresponding to one rotation of the crankshaft of the engine. The ignition pulses are shaped by the second waveform shaping circuit 5 so that a pulse train signal "d" is obtained at the output of the second waveform shaping circuit 5. The pulse train signal "d" is applied to the frequency divider 6 in which two output signals "e" and "f" are produced. The first output signal "e" has a frequency one fourth of the frequency of the pulse train signal "d", while the second output signal "f" has a frequency one eighth of the frequency of the pulse train signal "d". The first output signal "e" is fed to the clear terminal CL of the counter 7 to reset the counter 7 to zero each time the first output signal "e" assumes a high level. The second output signal "f" is fed to the reset terminal R of the flip-flop 8 to reset the same each time the second output signal "f" assumes a high level.

With this arrangement, the counter 7 counts the number of pulses of the pulse train signal "b" during a period of time $W_3$ for which the first output signal "e" of the frequency divider 6 assumes a low level. FIG. 2 illustrates the number of pulses of the pulse train signal "b" under an assumption that there is no slipping phenomenon along the belt so that the number of the pulses during the period $W_3$ is 32. A predetermined number is preset in the counter 7 so that the counter 7 produces an output signal of high level when the number of the input pulses reaches the predetermined number. This predetermined number is selected to correspond to a number smaller than the number (i.e. 32 in this example) of pulses that would have been counted under no slipping phenomenon. In this embodiment the preset number is 29 so that when the number of the pulses of the pulse train signal "b" reaches 29, the counter 7 produces a high level output signal "g".

The reason that the preset number (29) is selected smaller than the maximum possible number (32) is that a low rate of slipping can be tolerated. In the preferred embodiment, since the preset number is 29, the tolerance is approximately 10 percent. It will be understood that the tolerance of the slipping rate may be changed, if desired, by changing the preset number. The tolerance of the slipping rate is preferably set between 5 and 10 percent. From the foregoing it will be understood that the counter 7 does not produce a high level output signal "g" when the slipping rate exceeds the predetermined tolerance.

The high level output signal "g" of the counter 7 is used to set the flip-flop 8 so that the flip-flop 8 produces a high level output signal "h". The output Q of the flip-flop 8 assumes a high level until the flip-flop 8 is reset by the second output signal of the frequency divider 6. The output signal "h" of the flip-flop 8 is applied to the integrator 9 to be integrated therein. The integrator 9 has a predetermined time constant defind by the resistance and capacitance of a resistor and a capacitor constituting the integrator 9. If a high level signal from the flip-flop 8 is continuously aplied to the integrator 9, the integrator 9 output signal "l" assumes a high level of a predetermined value. However, upon absence of the high level signal from the flip-flop 8 the voltage of the output signal "i" of the integrator gradually falls approaching zero.

The output signal "i" of the integrator 9 is applied to the comparator 10 so that the voltage of the signal "i" is compared with the voltage Vs of the reference signal. Assuming that the voltage of the signal "i" is expressed in terms of Vi, the comparator 10 produces a high level signal "j" when Vi<Vs. The high level signal "j" from the comparator 10 is fed to the base of the transistor 11 to render the same conductive. Consequently, the lamp 12 is energized to emit light. This lamp 12 may be used as an alerting device so that the operator will ascertain that the slipping rate of the belt is over the tolerance. The lamp 12 may be substituted with other alarm devices such as a buzzer.

In the above described operation it will be recognized that the integrator 9 produces an output signal "i" indicative of the average voltage of the output signal "h" of the flip-flop 8 over a plurality of measuring intervals. Therefore, the number of measuring intervals, for which the average voltage is obtained, will be determined by the time constant of the discharging circuit of the integrator 8 and the reference voltage Vs of the comparator 10.

Although, the circuitry of the sensor shown in FIG. 1 does not include a circuit for holding or maintaining the output signal "j" of the comparator 10, such a holding circuit may be additionally provided in order to continously issue an alarm signal upon temporary presence of the high level output signal "j" of the comparator 10.

As described hereinabove, the counter 7 is reset to zero in response to the leading edge of the pulse signal "e" from the frequency divider 6. This means that the measuring interval $W_3$ for the counter 6 is four times longer than an interval defined by two consecutive ignition pulses "c". In theory it is possible to use a measuring interval corresponding to such an interval defined by two consecutive ignition pulses. However, the interval between two consecutive ignition pulses is not always constant due to inaccuracy of the rotatable cam of the breaker mechanism 4 of the ignition circuit 16. Therefore, it is advantageous to set the measuring period equal to a plurality of the like intervals for the error in each interval is averaged.

Figure 3:
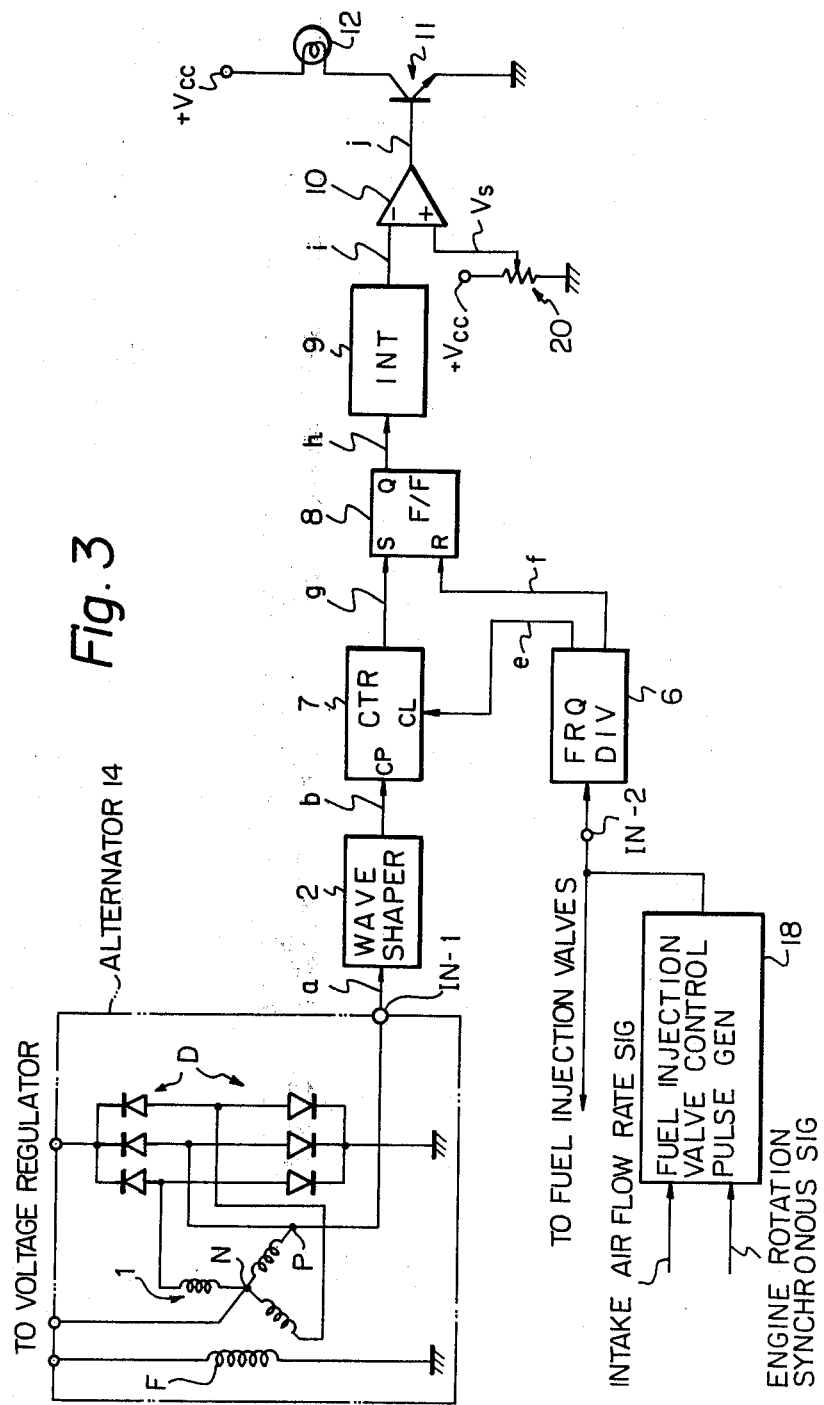
FIG. 3 shows a schematic block diagram of a second preferred embodiment of the belt drive connection malfunction sensor according to the present invention.

Reference is now made to FIG. 3 which shows a schematic block diagram of a second preferred embodiment of the belt drive connection malfunction sensor according to the present invention. The circuit arrangement of the second embodiment is the same as that of the first embodiment except that the second waveform shaping circuit 5 in the first embodiment is omitted. The second embodiment of the sensor is an example that the sensor circuit is responsive to a fuel injection control pulse signal when the fuel supply mechanism of the engine is a fuel injection system.

A fuel injection valve control pulse generator 18 which is of a conventional type is shown. The fuel injection valve control pulse generator 18 is basically responsive to a signal indicative of the airflow rate of the intake air which may be derived from a suitable airflow meter and a signal synchronous with the engine rotation. The fuel injection valve control pulse generator 18 produces an output pulse signal "K" by which fuel injection valves (not shown) are actuated to supply fuel into intake manifolds communicated with respective cylinders of the engine. The width of the fuel injection valve control pulses are controlled so as to supply suitable amount of fuel into the cylinders of the engine in accordance with the intake airflow rate, while the timing of the same pulses is synchronized with engine crankshaft rotation. It is assumed that the engine is of a six-cylinder, four-cycle type and six injection valves are provided. The fuel injection valve control pulse generator 18 produces three pulses "k" per a single rotation of the crankshaft of the engine. Since the duration required for a single rotation of the crankshaft of the engine is expressed in terms of $W_2$ in FIG. 4, three pulses "k" are applied to the input of the frequency divider 6 during this period of time $W_2$. Comparing FIG. 2 and FIG. 4, the pulses "k" are substantially the same as pulses "d" in the above described first embodiment. Therefore, the fuel injection valve control pulses "k" can be used in place of the pulses "d". Accordingly, the circuit of the second embodiment functions in the same manner as the first embodiment shown in FIG. 1.

Although in the above an example of a fuel injection system has been described, in which the number of fuel injection valve control pulses per a single rotation of the crankshaft of the engine is three, there are other possibilities in the frequency of pulses. For instance, a different type fuel injection system in which the fuel injection valves are simultaneously actuated once per one of two rotations, is known. When such a fuel injection system is used, there is no need to divide the frequency of the fuel injection pulses for producing a gate signal of the counter 7 since the number of the pulses per one or two rotations of the crankshaft is one. In other words, the frequency of the fuel injection valve control pulses "k" is reduced with respect to the frequency of the ignition pulses. In this case the injection valve control pulses "k" may be directly applied to the clear terminal CL of the counter 7, while the same pulses "k" may be applied to the reset terminal R of the flip-flop 8 either directly or via a frequency divider which divides the frequency of the pulses by two.

In this way, no matter what type of fuel injection system is used, the fuel injection valve control pulses "k" may be used directly or indirectly since the fuel injection valve control pulses are always in synchronization with the rotation of the crankshaft of the engine.

From the foregoing, it will be understood that the belt drive connection malfunction sensor according to the present invention detects malfunction of the belt drive connection more accurately than conventional sensors irrespective of the engine r.p.m. Furthermore, since the main portions of the sensor are of digital circuits, the accuracy of the sensor is hardly influenced by the variation of the ambient temperature and variation of the voltage of the power source. This is advantageous when the sensor is mounted on a motor vehicle since the voltage of the battery of the motor vehicle is apt to vary in a considerably wide range when a large amount of current is consumed by other circuits. Therefore, it is possible to directly use the battery as the power supply of the sensor when the sensor is installed in a motor vehicle.

What is claimed is:

1. A belt drive connection malfunction sensor for issuing an alarm signal when the engine power of an engine is not properly transmitted via a belt to an alternator, comprising:

(a) first means for producing a pulse train signal synchronous with a pulsating voltage generated by the alternator;
(b) second means for producing a reference timing signal synchronous with rotation of a crankshaft of the engine;
(c) third means responsive to said pulse train signal and said reference timing signal for producing an output signal when the number of the pulses of said pulse train signal reaches a predetermined value during a period of time defined by said reference timing signal;
(d) means for averaging said output signal of said third means; and
(e) alerting means responsive to said output signal of said third means which has been averaged by said averaging means,
wherein said averaging means comprises:
resettable means responsive to the output signal of said third means which has been averaged by said averaging means to be set and to the output signal of said second means to be reset,
an integrator responsive to the output signal of said resettable means, and
a comparator responsive to the output signal of said integrator.

2. A belt drive connection malfunction sensor as claimed in claim 1, wherein said first means comprises a waveform shaping circuit responsive to said pulsating voltage generated by the alternator.

3. A belt drive connection malfunction sensor as claimed in claim 1, wherein said second means comprises an ignition circuit of the engine which produces ignition pulses, and a waveform shaping circuit responsive to said ignition pulses.

4. A belt drive connection malfunction sensor as claimed in claim 3, wherein said second means comprises a frequency divider for producing said reference timing signal by dividing the frequency of said ignition pulses.

5. A belt drive connection malfunction sensor as claimed in claim 1, wherein said engine is equipped with a fuel injection system including fuel injection valve control pulse generator responsive to a signal indicative of the airflow of the engine intake air of said engine and a signal synchronous with the engine crankshaft rotation, and wherein said second means is responsive to said fuel injection valve control pulses.

6. A belt drive connection malfunction sensor as claimed in claim 5, wherein said second means comprises a frequency divider for producing said reference timing signal by dividing the frequency of said fuel injection valve control pulses.

7. A belt drive connection malfunction sensor as claimed in claim 1, wherein said third means comprises a presetable counter.

8. A belt drive connection malfunction sensor as claimed in claim 1, wherein said alerting means comprises a switching circuit responsive to the output signal of said comparator.

9. A belt drive connection malfunction sensor for issuing an alarm signal when the engine power of an engine is not properly transmitted via a belt to an alternator, the engine including an ignition circuit which produces ignition pulses, the alternator including a neutral point and a plurality of armature coils which are connected at one end terminal to each other, the plurality of armature coils including opposite end terminals, respectively, said belt drive connection malfunction sensor comprising:
(a) a first waveform shaping circuit responsive to a pulsating voltage developed at one of the opposite end terminals of the plurality of armature coils;
(b) a second waveform shaping circuit responsive to the ignition pulses produced by the ignition circuit;
(c) a frequency divider responsive to the output signal of said second waveform shaping circuit for producing first and second output signals the frequencies of which are lower than that of the ignition pulses, the frequency of the second output signal being lower than that of the first output signal;
(d) a counter responsive to the output signal of said first waveform shaping circuit for producing an output signal when the number of the pulses from the first waveform shaping circuit reaches a predetermined value, which is preset in said counter, during a period of time determined by said first output signal of said frequency divider;
(e) a flip-flop responsive to the output signal of said counter to be set and said second signal of said frequency divider to be reset;
(f) an integrator responsive to the output signal of said flip-flop;
(g) a comparator responsive to the output signal of said integrator for producing an output signal when the voltage of the output signal of said integrator exceeds a predetermined reference value;
(h) a switching transistor responsive to the output signal of said comparator; and
(i) an alerting device responsive to said switching transistor.

10. A belt drive connection malfunction sensor for issuing an alarm signal when the engine power of an engine is not properly transmitted via a belt to an alternator, the engine including a fuel injection valve control pulse generator which produces fuel injection valve control pulses, the alternator including a neutral point and a plurality of armature coils which are connected at one end terminal to each other, the plurality of armature coils including opposite end terminals, respectively, said belt drive connection malfunction sensor comprising:
(a) a waveform shaping circuit responsive to a pulsating voltage developed at one of the opposite end terminals of the plurality of armature coils;
(b) a frequency divider responsive to the fuel injection valve control pulses for producing first and second output signals the frequencies of which are lower than that of the valve control pulses applied to said engine, the frequency of the second output signal being lower than that of the first output signal;
(c) a counter responsive to the output signal of said waveform shaping circuit for producing an output signal when the number of the pulses from the waveform shaping circuit reaches a predetermined value, which is preset in said counter, during a period of time determined by said first output signal of said frequency divider;
(d) a flip-flop responsive to the output signal of said counter to be set and said second output signal of said frequency divider to be reset;
(e) an integrator responsive to the output signal of said flip-flop;

(f) a comparator responsive to the output signal of said integrator for producing an output signal when the voltage of the output signal of said integrator exceeds a predetermined reference value;

(g) a switching transistor responsive to the output signal of said comparator; and (h) an alerting device responsive to said switching transistor.

* * * * *